(12) United States Patent
Hirata et al.

(10) Patent No.: US 7,940,492 B2
(45) Date of Patent: May 10, 2011

(54) HYDRODYNAMIC BEARING DEVICE, SPINDLE MOTOR, AND RECORDING AND REPRODUCING APPARATUS

(75) Inventors: Koji Hirata, Ehime (JP); Hiroaki Saito, Ehime (JP); Takao Yoshitsugu, Ehime (JP); Hiroyuki Kiriyama, Ehime (JP)

(73) Assignee: Panasonic Corporation, Osaka (JP)

( * ) Notice: Subject to any disclaimer, the term of this patent is extended or adjusted under 35 U.S.C. 154(b) by 826 days.

(21) Appl. No.: 11/940,036

(22) Filed: Nov. 14, 2007

(65) Prior Publication Data

US 2008/0112306 A1 May 15, 2008

(30) Foreign Application Priority Data

Nov. 15, 2006 (JP) .................................. 2006-308792

(51) Int. Cl.
*G11B 17/02* (2006.01)
(52) U.S. Cl. ........................................ 360/99.08
(58) Field of Classification Search ............... 360/99.08
See application file for complete search history.

(56) References Cited

U.S. PATENT DOCUMENTS

| | | | | |
|---|---|---|---|---|
| 6,982,510 B1* | 1/2006 | Ajello et al. | ................ | 310/90 |
| 7,133,250 B2* | 11/2006 | Herndon et al. | ............ | 360/99.08 |
| 7,262,935 B2* | 8/2007 | LeBlanc | ................ | 360/99.08 |
| 7,391,139 B2* | 6/2008 | Yamamoto | ................ | 310/90 |
| 2008/0129139 A1* | 6/2008 | Wakitani et al. | ............ | 310/216 |
| 2008/0304776 A1* | 12/2008 | Asada et al. | ................ | 384/112 |

FOREIGN PATENT DOCUMENTS

JP 2004-183865 7/2004

* cited by examiner

*Primary Examiner* — Mark Blouin
(74) *Attorney, Agent, or Firm* — Wenderoth, Lind & Ponack, L.L.P.

(57) ABSTRACT

In order to prevent oil leakage in a hydrodynamic bearing device comprising an opening section in close proximity to a radial bearing and a lubricating fluid reservoir, a shaft 10, thrust flange 16, sleeve 11, seal plate 21, and stopper plate 20 are provided, a radial dynamic pressure bearing is formed in a radial clearance between the shaft 10 and sleeve 11, and a thrust dynamic pressure bearing is formed in a thrust direction clearance between the sleeve 11 and thrust flange 16. A connecting hole 11d is formed that connects a gap between the sleeve 11 and seal plate 21 and a thrust direction gap between the sleeve 11 and thrust flange 16. The relationship $A<B<C$ is satisfied, where A is a radial clearance, B is a clearance between an outer peripheral surface of the shaft 10 and an inner peripheral surface of the seal plate 21, and C is a clearance between a lower surface of the seal plate 21 and an upper end face of the sleeve 11.

18 Claims, 13 Drawing Sheets

HYDRODYNAMIC BEARING DEVICE, SPINDLE MOTOR, AND RECORDING AND REPRODUCING APPARATUS

BACKGROUND OF THE INVENTION

1. Field of the Invention

The present invention relates to hydrodynamic bearing devices, spindle motors, and recording and reproducing apparatuses, and in particular, to hydrodynamic bearing devices utilizing dynamic pressure of a fluid and used in spindle motors and the like for driving the rotation of disk shaped recording media, and the spindle motors and recording and reproducing apparatuses using those hydrodynamic bearing devices.

2. Description of the Related Art

In recent years, as the memory capacity of recording and reproducing apparatuses such as disk drive devices driving the rotation of magnetic disks, optical disks, magneto-optical disks, and other disk shaped recording media increases, the data transfer speeds thereof are also becoming faster. For this reason, hydrodynamic bearing devices, which are capable of supporting shafts driven to rotate at high speed with a high degree of accuracy, are being used as the bearing devices of motors used in this type of disk drive device.

In a general hydrodynamic bearing device, oil is filled as a lubricating fluid constituting a lubricant between an outer peripheral surface of a shaft and an inner peripheral surface of a sleeve that constitutes a support section for supporting the shaft, and dynamic pressure is generated by herringbone-shaped grooves formed on either the outer peripheral surface of the shaft or the inner peripheral surface of the support section, forming a radial bearing supporting a load of a rotating body in a radial direction upon rotation. Furthermore, oil is filled between a disk-shaped thrust plate secured to an end of the shaft and the support-section sleeve, and dynamic pressure is generated by spiral-shaped grooves formed on one of the opposing surfaces of the thrust plate and the support section, forming a thrust bearing supporting a load of the rotating body in an axial direction (rotation axis direction) upon rotation.

Hydrodynamic bearing devices can have either a fixed-shaft type or a rotating-shaft type, and in, for example, a hydrodynamic bearing of the rotating-shaft type and having a bag structure (one end of the bearing is closed), it has been disclosed that the relationships of clearances for preventing leakage of oil between clearances labeled A to H of the bearing interior, as shown in FIG. 11, are G<H; A<B and A<D; C<B and C<D; B<H and D<H; E<D, E<F, and E<H; and G<F, G<D, and F<H. When the above relationships are satisfied, sealing pressure is, as shown in FIG. 12, large at E, G, A, and C sections, and since oil collects at these sections with small gaps, the leakage of oil is prevented.

Patent document 1: JP 2004-183865A

SUMMARY OF THE INVENTION

The relationships of clearances required to prevent leakage of lubricating fluid (for example, oil) were discovered with the above-explained hydrodynamic bearing having a rotating-shaft type and bag structure (one end of the bearing is closed). However, in the case of hydrodynamic bearings having a fixed-shaft type and a single-thrust construction, for example, prevention measures (design approaches) against oil leaks and the like have been inadequate, and the possibility of oil leakage as a result of disparity in component precision and assembly error remained. Furthermore, this applies not only to the above-described construction, but also to constructions having a lubricating fluid reservoir and an opening section open to outside air in close proximity to a radial bearing.

It is an object of the present invention to set relationships between bearing-interior clearances so as to prevent the leakage of oil in a hydrodynamic bearing having a single-thrust construction and, for example, a fixed-shaft type or in a hydrodynamic bearing having a construction comprising a lubricating fluid circulation channel, a lubricating fluid reservoir, and an opening section open to outside air in close proximity to a radial bearing, and to provide a hydrodynamic bearing device with a higher level of reliability and a motor and a disk drive device using the hydrodynamic bearing.

As a means of resolving the above problems, a hydrodynamic bearing device according to a first aspect of the present invention includes a shaft, a sleeve configured to rotate relative to the shaft, having an inner peripheral surface opposing an outer peripheral surface of the shaft at a distance in a radial direction so as to form a first gap therebetween, a sealing member provided as one with the sleeve, having an inner peripheral surface opposing an outer peripheral surface of the shaft at a distance in a radial direction so as to form a second gap therebetween, and having an end face opposing one side end face of the sleeve at a distance in an axis direction so as to form a third gap therebetween, and a thrust flange provided in close proximity to an end of the shaft, having a diameter larger than that of the shaft, and having an end face opposing the other side end face of the sleeve at a distance in an axis direction so as to form a fourth gap therebetween. At least one connecting channel is provided between the third gap and the fourth gap to connect the third gap and the fourth gap. A lubricating fluid is retained in at least the first gap, the third gap, the fourth gap, and the connecting channel. A radial dynamic pressure bearing is formed in the first gap. An interface between the lubricating fluid and the atmosphere is formed in the second gap. The radial clearance A of the first gap, the radial clearance B of the second gap, and the axis direction clearance C of the third gap satisfy the relationship A<B<C.

Furthermore, a hydrodynamic bearing device according to another aspect of the present invention includes a shaft, a sleeve configured to rotate relative to the shaft, having an inner peripheral surface opposing an outer peripheral surface of the shaft at a distance in a radial direction so as to form a first gap therebetween, a sealing member provided as one with the sleeve, having an inner peripheral surface opposing an outer peripheral surface of the shaft at a distance in a radial direction so as to form a second gap therebetween, and having an end face opposing one side end face of the sleeve at a distance in an axis direction so as to form a third gap therebetween, and a thrust plate opposing the other side end face of the sleeve at a distance in an axis direction so as to form a fourth gap therebetween and sealing one opening end of the sleeve. At least one connecting channel is provided between the third gap and the fourth gap to connect the third gap and the fourth gap. A lubricating fluid is retained in at least the first gap, the third gap, the fourth gap, and the connecting channel. A radial dynamic pressure bearing is formed in the first gap. An interface between the lubricating fluid and the atmosphere is formed in the second gap. The radial clearance A of the first gap, the radial clearance B of the second gap, and the axis direction clearance C of the third gap satisfy the relationship A<B<C.

Furthermore, a hydrodynamic bearing device according to another aspect of the present invention includes a shaft having a cylindrical section and a small diameter cylindrical section provided via a step surface in close proximity to one end of the cylindrical section and having a diameter smaller than the outer diameter of the cylindrical section, a sleeve configured to rotate relative to the shaft, having an inner peripheral surface opposing an outer peripheral surface of the cylindrical section of the shaft at a distance in a radial direction so as to form a first gap therebetween, a sealing member provided as one with the sleeve, having an inner peripheral surface opposing an outer peripheral surface of the small diameter cylindrical section of the shaft at a distance in a radial direction so as to form a second gap therebetween, and having an end face opposing both the step surface of the shaft at a distance in an axis direction so as to form a fifth gap therebetween and one side end face of the sleeve at a distance in an axis direction so as to form a third gap therebetween, and a thrust flange provided in close proximity to the other end side of the shaft, having an end face opposing the other side end face of the sleeve at a distance in an axis direction so as to form a fourth gap therebetween, and having a diameter larger than that of the cylindrical section of the shaft. At least one connecting channel is provided between the third gap and the fourth gap to connect the third gap and the fourth gap. A lubricating fluid is retained in at least the first gap, the third gap, the fourth gap, and the connecting channel. A radial dynamic pressure bearing is formed in the first gap. An interface between the lubricating fluid and the atmosphere is formed in the fifth gap. A radial clearance A of the first gap, an axis direction clearance D of the fifth gap, and an axis direction clearance C of the third gap satisfy the relationship A<D<C.

Furthermore, a hydrodynamic bearing device according to another aspect of the present invention includes a shaft having a cylindrical section and a small diameter cylindrical section provided via a step surface in close proximity to one end of the cylindrical section and having a diameter smaller than the outer diameter of the cylindrical section, a sleeve configured to rotate relative to the shaft, having an inner peripheral surface opposing an outer peripheral surface of the cylindrical section of the shaft at a distance in a radial direction so as to form a first gap therebetween, a sealing member provided as one with the sleeve, having an inner peripheral surface opposing an outer peripheral surface of the small diameter cylindrical section of the shaft at a distance in a radial direction so as to form a second gap therebetween, and having an end face opposing both the step surface of the shaft at a distance in an axis direction so as to form a fifth gap therebetween and one side end face of the sleeve at a distance in an axis direction so as to form a third gap therebetween, and a thrust plate opposing the other side end face of the sleeve at a distance in an axis direction so as to form a fourth gap therebetween and sealing one opening end of the sleeve. At least one connecting channel is provided between the third gap and the fourth gap to connect the third gap and the fourth gap. A lubricating fluid is retained in at least the first gap, the third gap, the fourth gap, and the connecting channel. A radial dynamic pressure bearing is formed in the first gap. An interface between the lubricating fluid and the atmosphere is formed in the fifth gap. A radial clearance A of the first gap, an axis direction clearance D of the fifth gap, and an axis direction clearance C of the third gap satisfy the relationship A<D<C.

A hydrodynamic bearing device according to yet another aspect of the present invention has a hydrodynamic bearing using a lubricating fluid and includes a shaft, a sleeve configured to rotate relative to the shaft, having an inner peripheral surface opposing an outer peripheral surface of the shaft at a distance in a radial direction so as to form a first gap therebetween, and a sealing member provided as one with the sleeve such that a second gap is formed between the sealing member and the shaft and having an end face opposing one side end face of the sleeve at a distance in an axis direction so as to form a third gap therebetween. An interface between the lubricating fluid and the atmosphere is formed in the second gap. The relationship is First gap size<Second gap size<Third gap size.

Since the size relationships of the bearing clearance sections are optimally set as explained above, the hydrodynamic bearing device according to the present invention makes it possible to configure a high-precision, long-lifespan hydrodynamic bearing device wherein the lubricating fluid is retained and circulated in an interior thereof without leakage to an exterior. As a result, it is unlikely that the lubricating fluid runs out in bearing gaps.

DETAILED DESCRIPTION OF THE INVENTION

The following is a detailed explanation of embodiments of the hydrodynamic bearing device according to the present invention with reference to the accompanying drawings.

First Embodiment

Figure 1:
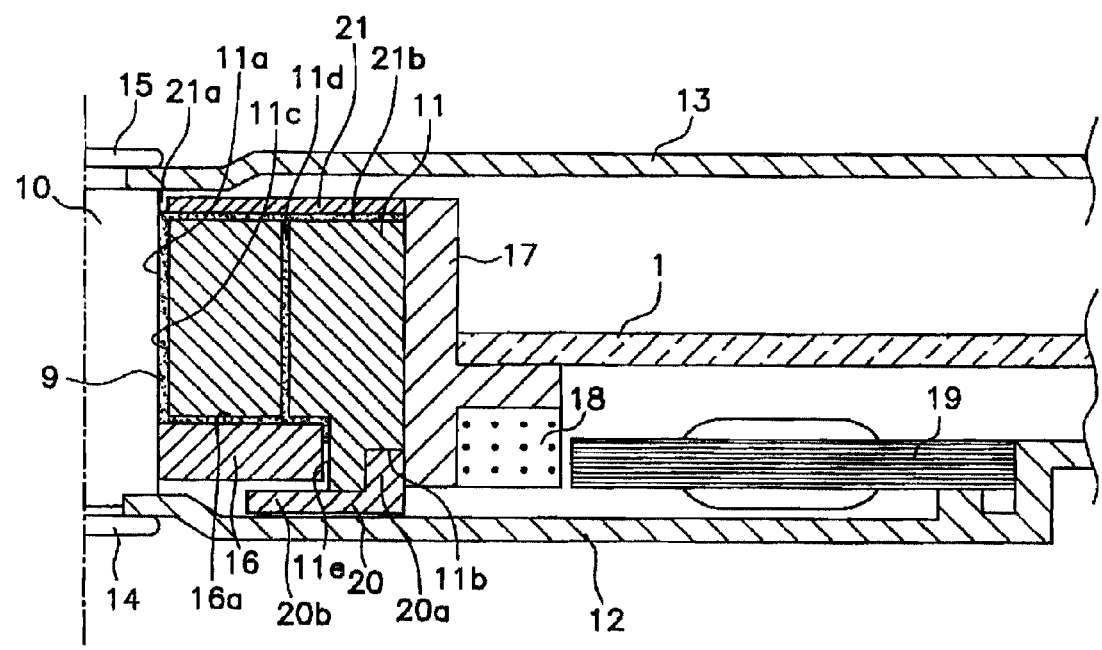
FIG. 1 is a partial cross-sectional view showing a motor for a disk drive device that uses a hydrodynamic bearing device of a first embodiment of the present invention.

FIG. 1 is a partial cross-sectional view showing a configuration of a motor for a disk drive device that uses a hydrodynamic bearing device having a fixed-shaft type with both ends thereof open and constituting a first embodiment of the present invention. As this has substantially symmetrical left and right sides, FIG. 1 shows a cross-sectional view of a right-side half. Furthermore, an internal configuration of the both-end open, fixed-shaft type hydrodynamic bearing of the same embodiment is shown in a schematic manner in FIG. 2.

Overall Configuration

As shown in FIG. 1, a column shaped shaft 10 is inserted into a bearing hole 11a of a cylindrical sleeve 11 so as to be relatively rotatable. An outer peripheral surface of the shaft 10 and an inner peripheral surface of the sleeve 11 are mutually opposed at a distance so as to form a radial gap therebetween, this radial gap constitutes a first gap (radial clearance A), and the value thereof is of the order of several micrometers.

Oil 9 is retained as a lubricating fluid between the shaft 10 and the sleeve 11. It should be noted that, other than oil, highly fluid grease, ionic liquids, and the like can also be used as the lubricating fluid.

A disk shaped seal plate 21 is provided as a sealing member at a position opposing an upper end face (that is, a face perpendicular to a rotation axis) of the sleeve 11, and this seal plate 21 is secured to an inner peripheral side of a cylindrical rotor hub 17 and configured as one with a sleeve 11. An inner peripheral surface of the seal plate 21 opposes an outer peripheral surface of the shaft 10 in a radial direction. An opening section 21a is formed therebetween, and this opening section 21a constitutes a second gap (radial clearance B). Furthermore, an upper end face of the sleeve 11 and a lower surface of the seal plate 21 are opposed to each other in an axis direction. A lubricating fluid reservoir 21b is formed therebetween, and this lubricating fluid reservoir 21b constitutes a third gap (axis direction clearance C of FIG. 2).

Figure 2:
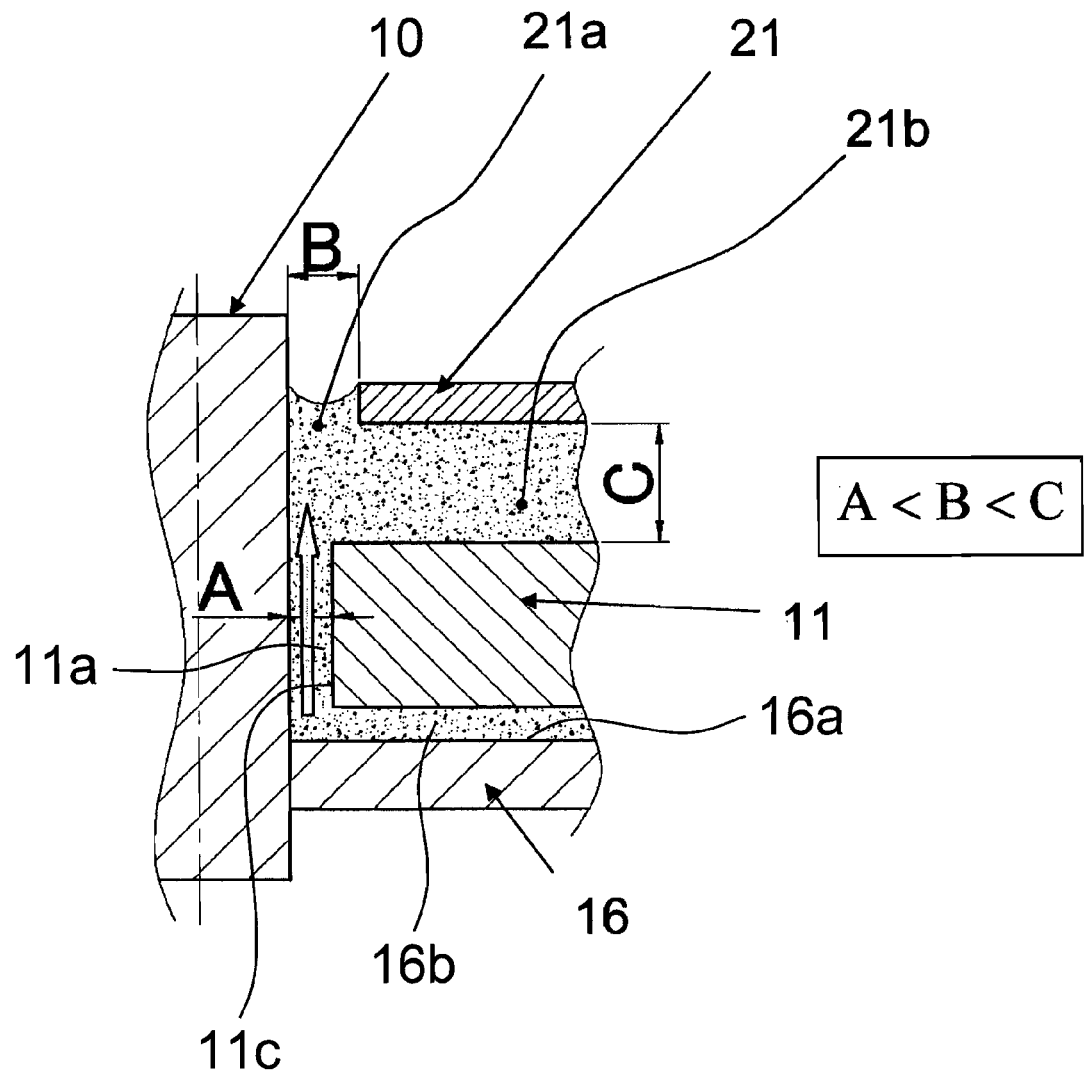
FIG. 2 is a cross-sectional view showing a configuration of an interior of the hydrodynamic bearing of a first embodiment of the present invention in a schematic manner.

Furthermore, a disk shaped thrust flange 16 extending in a direction perpendicular to the central shaft (that is, a radial direction) is secured/provided at a lower side of the shaft 10. The thrust flange 16 is accommodated in a depression section lie formed in the sleeve 11 and is configured so as to support the rotating sleeve 11. An upper surface of the thrust flange 16 opposes a lower surface of the sleeve 11 in the axis direction. A space 16b is formed therebetween as shown in FIG. 2, and this space 16b constitutes a fourth gap.

Furthermore, at least one connecting hole 11d extending parallel to the rotation axis is formed in the sleeve 11. The connecting hole 11d connects the third gap, being the gap between the opposing sleeve 11 and seal plate 21, and the fourth gap, being the gap between the opposing sleeve 11 and thrust flange 16. It should be noted that a connecting channel is not limited to a connecting hole formed by, for example, drill machining in a sleeve and may, for example, be formed by a groove formed at an outer peripheral section of the sleeve to form a connecting channel with an inner peripheral section of a rotor hub.

A base 12 is fixed to a bottom end of the shaft 10 by a screw 14, and a cover 13 is mounted on a top end of the shaft 10 by a screw 15.

The rotor hub 17 is secured to an outer peripheral surface of the sleeve 11. An annular rotor magnet 18 having an outer periphery magnetized with multiple poles in a circumferential direction is secured to a lower side (that is, towards a direction of disposition of the base 12) of a disk 1 secured to the rotor hub 17, and this rotor magnet 18 is disposed so as to oppose a core 19, constituting a stator of a motor section, secured to the base 12. The core 19 is formed with a plurality of salient poles facing radially inward.

Furthermore, as shown in FIG. 1, a step section 11b is formed at a lower side of an outer peripheral portion of the sleeve 11, and an annular stopper plate 20 is secured to this step section 11b. The stopper plate 20 has an annular fixing section 20a and an annular flange 20b extending therefrom radially inward and disposed below the thrust flange 16. Radial hydrodynamic grooves 11c of a herringbone pattern well known to a person skilled in the art is formed on an inner peripheral surface of the bearing hole 11a of the sleeve 11.

Furthermore, thrust hydrodynamic grooves 16a of a herringbone pattern or a spiral pattern are formed on a surface within an upper surface of the thrust flange 16 opposing the sleeve 11. Oil 9 is retained as a lubricating fluid in the radial clearance (first gap) defined by the opposing surfaces of the shaft 10 and the sleeve 11, in the lubricating fluid reservoir 21b (third gap) defined by the opposing surfaces of the sleeve 11 and the seal plate 21, and in the space 16b (fourth gap) defined by the opposing surfaces of the thrust flange 16 and the sleeve 11. The above-described spaces includes a minute gap defined by the surfaces on which the radial hydrodynamic grooves 11c and the thrust hydrodynamic grooves 16a are formed.

Bearing Configuration

A bearing configuration is explained hereinafter with reference to FIG. 3.

Figure 3A:
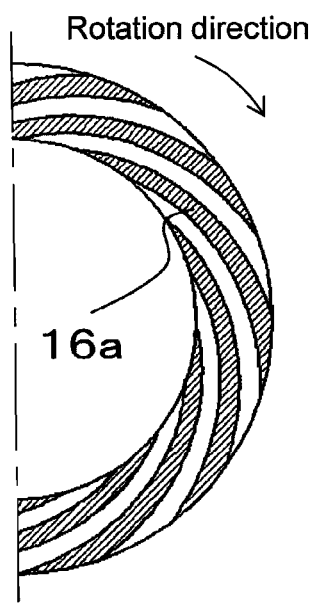
FIG. 3A, FIG. 3B, and FIG. 3C are plan views of a shape of thrust hydrodynamic grooves.
Figure 3B:
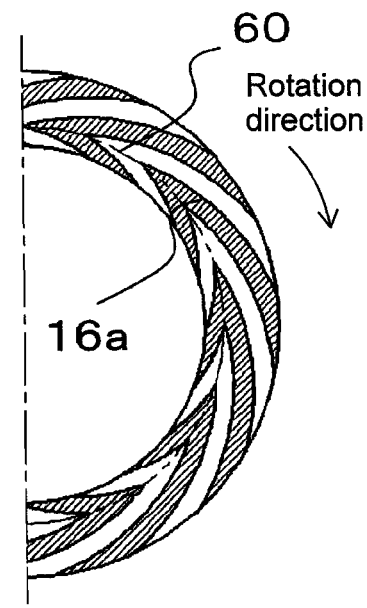
Figure 3C:
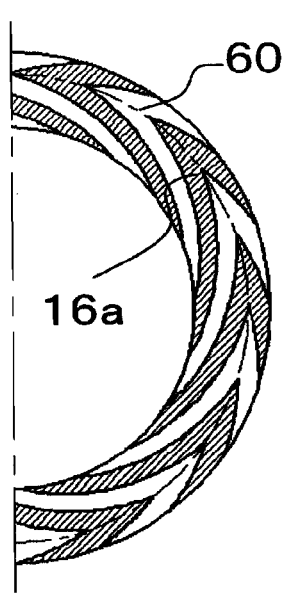
Figure 3D:
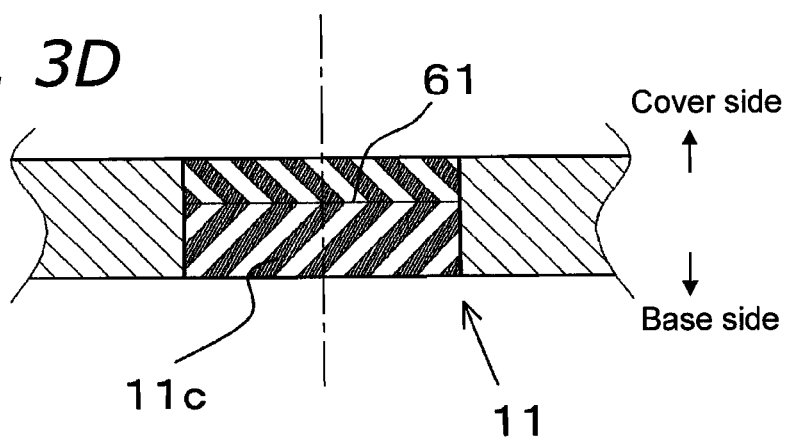
FIG. 3D and FIG. 3E are cross-sectional views showing a shape of radial hydrodynamic grooves.

The radial hydrodynamic grooves 11c, formed on the inner peripheral surface of the bearing hole 11a of the sleeve 11 by way of plastic working using ball rolling or chemical-type electrochemical machining, and the thrust hydrodynamic grooves 16a, formed on the surface opposing the sleeve 11 within the upper surface of the thrust flange 16 by way of plastic working using coining, chemical-type etching, or electrochemical machining, are formed such that the oil 9 in the lubricating fluid reservoir 21b flows from the inner side to the outer side in the radial direction of the sleeve 11. In specific terms, a thrust bearing is formed with a spiral pattern as shown in FIG. 3A or a herringbone pattern with a fold-back pitch circle 60 on a radially inner portion as shown in FIG. 3B in order that the oil 9 moves radially inward, and a radial bearing is formed with an asymmetric herringbone pattern having grooves at a lower side (cover side) longer than a radial fold-back section 61 as shown in FIG. 3D.

Furthermore, as shown in FIG. 2, since the inner peripheral end face of the seal plate 21 and the outer peripheral surface of the shaft 10 are separated at a prescribed distance (B) so as to form the opening section 21a, the seal plate 21 is capable of discharging air bubbles from the lubricating-fluid oil 9 to an atmosphere side.

In addition, as the lubricating fluid reservoir 21b, formed by the sleeve 11 and the seal plate 21, is, as shown in FIG. 1, connected to the thrust bearing formed by the opposing surfaces of the sleeve 11 and the thrust flange 16 via the connecting hole 11d formed in the sleeve 11, functionality of adjusting a pressure of the thrust bearing is provided.

The following is an explanation of a case wherein a hydrodynamic bearing of a fixed-shaft/single-thrust type as explained above is configured such that oil 9 circulates in an arrow direction of FIG. 2 and an air-fluid interface exists between an outer peripheral surface of the shaft 10 and an inner peripheral surface of the seal plate 21. It should be noted that the base 12, cover 13, screw 14, and screw 15 shown in FIG. 1 are omitted from FIG. 2.

Figure 11:
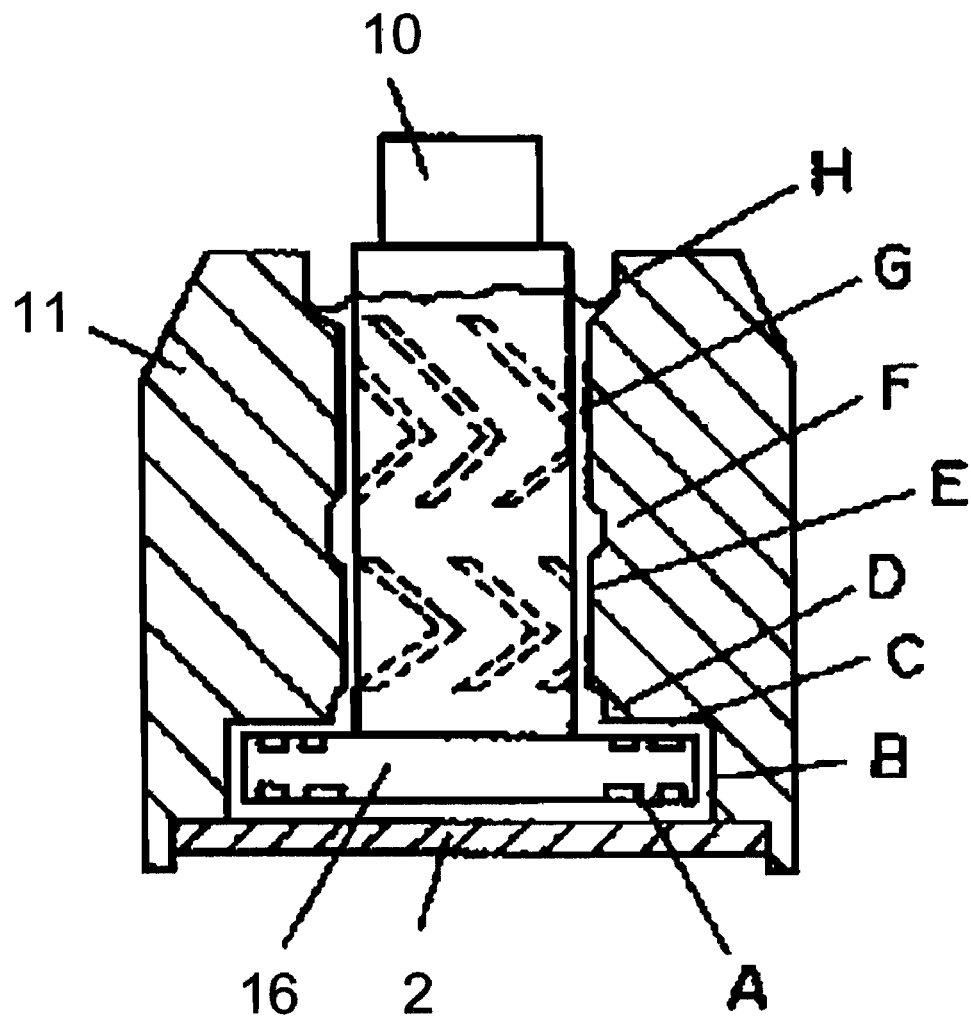
FIG. 11 is a cross-sectional view of a bearing of a conventional hydrodynamic bearing device.
Figure 12:
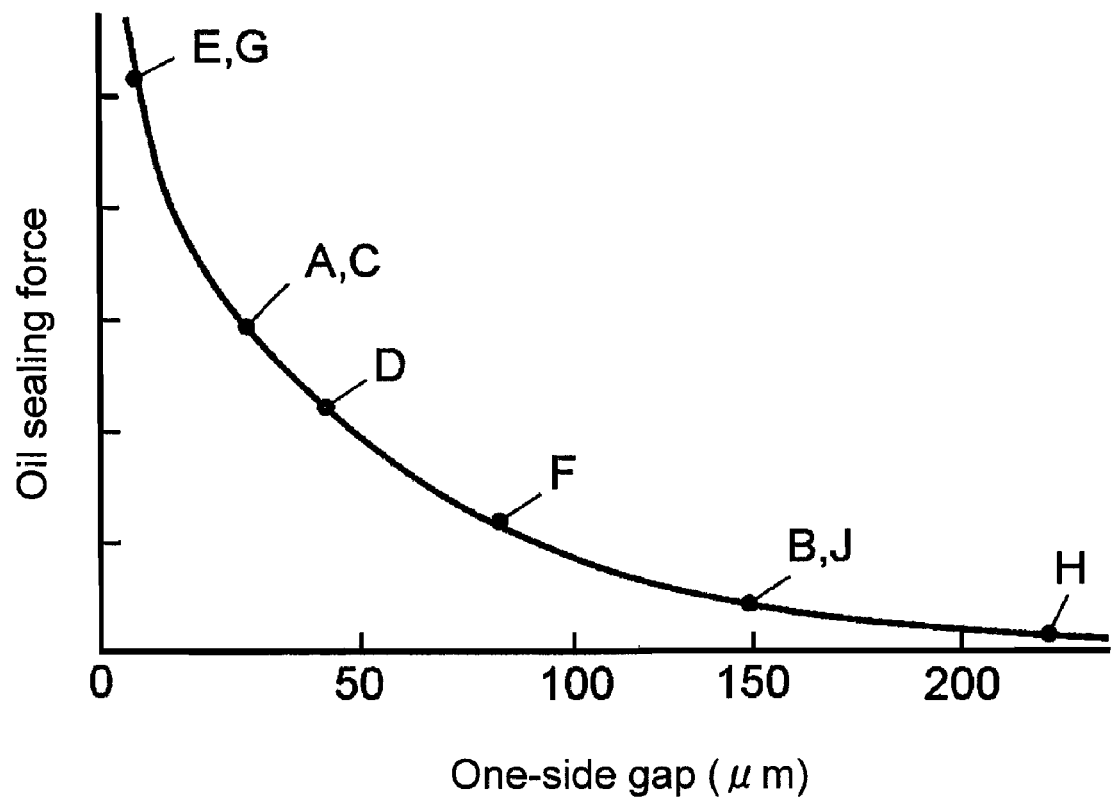
FIG. 12 is a view showing oil sealing forces of each clearance within a bearing of a conventional hydrodynamic bearing device.

Under a force of circulation, the oil 9 moves through a radial clearance (first gap) in a direction from the bottom of FIG. 2 to the top thereof. After passing through the radial clearance, the oil 9 moves towards the opening section 21a (second gap) and the lubricating fluid reservoir 21b (third gap). If a clearance is not properly set, the oil 9 will move to the opening section 21a and leak therefrom. Based on the design approach (see FIG. 11), a clearance dimension was initially set smaller than an opening section in order to make an oil sealing force of the interior of the bearing larger than the opening section. In FIG. 2, for example, a clearance B of the opening section 21a was made larger than another clearance A or another clearance C. However, leakage of oil occurred with that type of configuration. Consequently, as a result of investigation of the cause, a dimensional relationship was set such that A<B<C in the present invention in order to make it easier for the oil 9 to move to the lubricating fluid reservoir 21b, where A is a radial bearing clearance, B is a clearance of the opening section 21a to outside air, and C is an axis direction clearance of the lubricating fluid reservoir 21b. As a result of this, it was possible to eliminate oil leakage.

Figure 4:
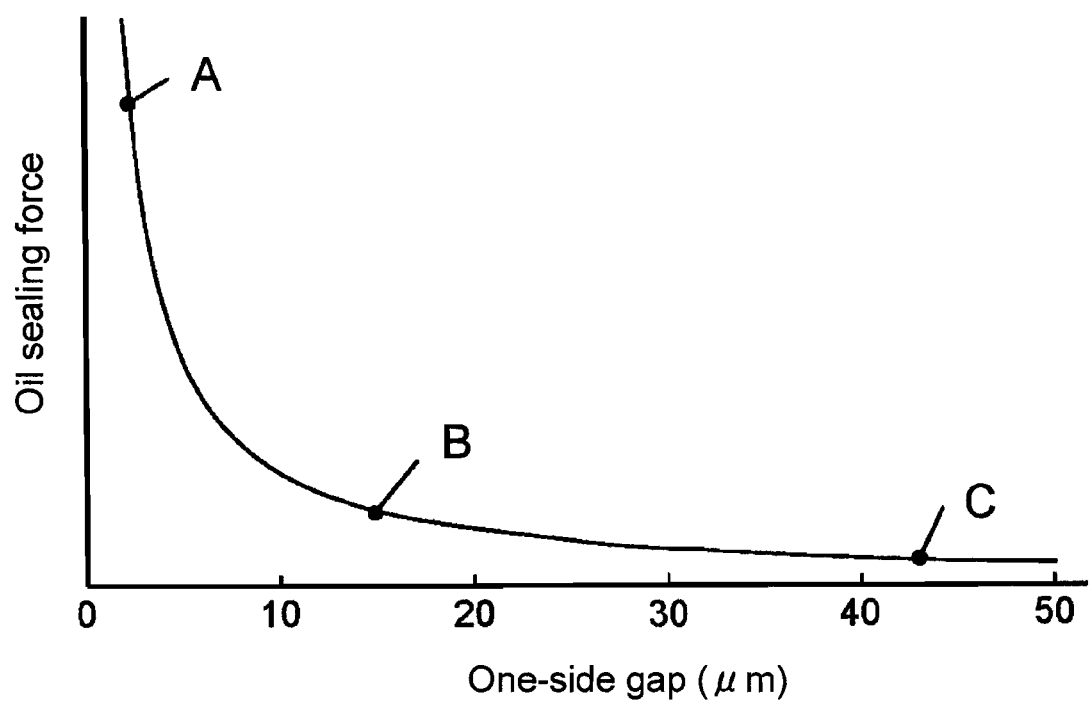
FIG. 4 is a view showing oil sealing forces of each clearance within a hydrodynamic bearing of a first embodiment of the present invention.

Explaining with reference to FIG. 4, when, for example, clearance A is between 0 and 5 μm, clearance B is between 5 and 35 μm, and clearance C is between 35 and 60 μm, an oil seal pressure of each gap is as shown in FIG. 4. That is to say, the relationship between flow passage resistances in the clearances is $R_A > R_B > R_C$, and since it is easier for the oil 9 having flowed to a point of branching from clearance A to clearance B and clearance C to circulate in a direction, not to the clearance B in the opening section 21a, but to the clearance C having smaller channel resistance, as shown in FIG. 2, the oil 9 flows smoothly towards the lubricating fluid reservoir 21b, and oil leakage from the opening section 21a can be prevented.

Figure 3E:
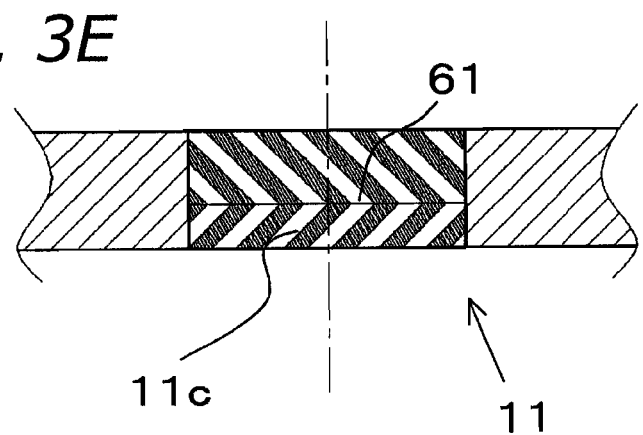

The above explanation concerns conditions for allowing no leakage of the oil 9 from the opening section 21a, wherein the oil 9 moves through a radial clearance (first gap) under a force of circulation in a direction from the bottom of FIG. 2 to the top thereof, It should be noted that, however, when circulation is in the direction opposite to the arrow of FIG. 2, it is necessary to determine conditions for preventing air bubbles from coming in from the opening section 21a. A case will be explained wherein the oil 9 flows from the top of FIG. 2 to the bottom thereof. For example, a shape of the thrust hydrodynamic grooves is, as shown in FIG. 3C, a herringbone pattern having the fold-back pitch circle 60 on a radially outer side thereof, and a radial bearing has, as shown in FIG. 3E, an asymmetric herringbone pattern having longer grooves on the upper side of the radial fold-back section 61. By setting such a radial hydrodynamic groove shape, the oil 9 flows from the top of FIG. 2 to the bottom thereof in the radial bearing section. At this time, if the radial clearance B of the opening section 21a is larger than the axis direction clearance C of the lubricating fluid reservoir 21b, flow passage resistance in the opening section 21a becomes smaller than that of the lubricating fluid reservoir 21b, and therefore, air bubble comes in from the opening section 21a more readily, and the radial bearing section will run out of oil.

In order to prevent the oil from running out in this type of situation, it is favorable for the flow passage resistance in the opening section 21a to be made larger than the flow passage resistance in the lubricating fluid reservoir 21b. That is to say, as the relationship A<<B<C is satisfied in this case also in the present invention, flow passage resistance in the clearance B is larger than the flow passage resistance in the clearance C, and therefore, it becomes less likely that air bubbles comes into the bearing.

Hereinafter, the size relationships of the above-explained clearances are again explained. Generally, in the conventional design approach, dimensions have been designed so as to ensure that radial clearance A<axis direction clearance C<radial clearance B in order to reduce flow passage resistance inside the bearing. However, it was not possible to reduce the leakage of a lubricating fluid with that type of configuration.

Reviewing the problem, the inventor recognized that, when a circulation loop is formed inside the bearing, the flow passage resistance of a clearance (for example, clearance C) in close proximity to an opening section (a section wherein an air-fluid boundary has been formed) must be made smaller than the flow resistance in clearance B of the opening section. From the above, an excellent configuration having A<B<C was invented as a new design approach.

When a plurality of clearance elements (for example, an oil reservoir, a connecting hole, a thrust bearing, a radial bearing, and a conical bearing) are provided within a circulation loop, the new comprehensive design approach achieved through cause investigation sets $R_A > R_B > R_C$, where $R_B$ is the flow resistance of the opening section, and $R_A$ and $R_C$ are the flow resistances of clearance elements in close proximity.

Second Embodiment

Figure 5:
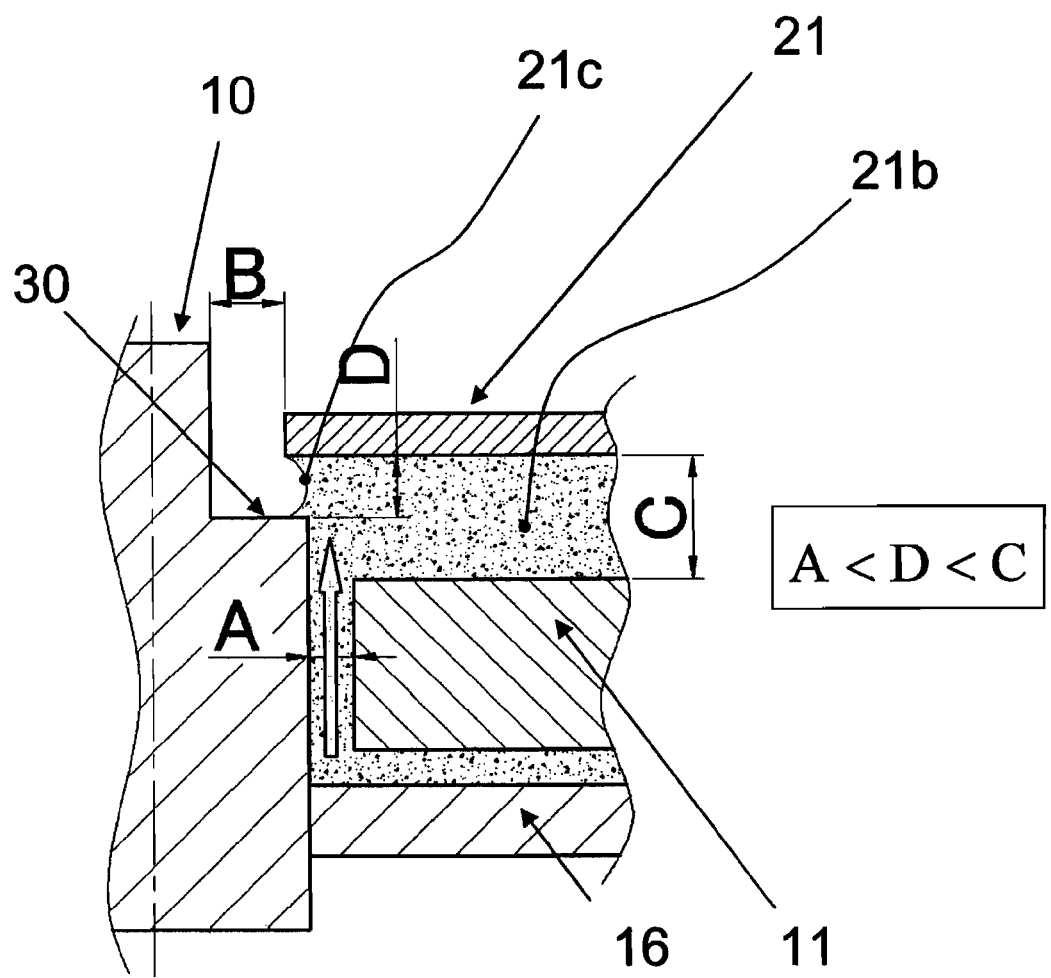
FIG. 5 is a cross-sectional view showing a configuration of an interior of the hydrodynamic bearing of a second embodiment of the present invention in a schematic manner.

Hereinafter, a second embodiment of the present invention is explained with reference to FIG. 5. The base 12, cover 13, screw 14, and screw 15 shown in FIG. 1 are omitted from FIG. 5. FIG. 5 is a cross-sectional view showing in a schematic manner an interior of a hydrodynamic bearing having a shaft with both fixed ends. In this second embodiment of the hydrodynamic bearing device, a shaft 10 is provided with a shaft step section 30, an opening section 21c is formed between an axis-direction upper side end face of this shaft step section 30 and a lower surface of a seal plate 21, and an air-fluid boundary is formed therein. Other configuration is identical to that of the first embodiment.

In this case also, under the force of circulation in a direction from the bottom of FIG. 5 to the top thereof, the oil 9 moves through a radial clearance (first gap). After passing through the radial clearance (first gap), the oil 9 moves towards the opening section 21c and a lubricating fluid reservoir 21b (third gap). As explained with regard to the first embodiment, if clearances are not set properly, the oil 9 will move towards the opening section 21c and leak therefrom. Consequently, by setting a dimensional relationship such that A<D<C in the present invention in order to make it easier for the oil 9 to move to the lubricating fluid reservoir 21b, where A is the radial bearing clearance, D is a clearance of the opening section 21c, and C is an axis direction clearance of the lubricating fluid reservoir 21b, the oil 9 can circulate easily, not to the opening section 21c, having high flow resistance, but to the lubricating fluid reservoir 21b, and oil leakage can be prevented.

It should be noted that, the above explanation concerns conditions for no leakage of the oil 9 from the opening section 21c when the oil 9 moves through the radial clearance (first gap) under a force of circulation in a direction from the bottom of FIG. 5 to the top thereof. However, in a case wherein circulation is in an opposite direction to an arrow of FIG. 5, it is necessary to determine conditions for preventing the air bubbles from coming in from the opening section 21c. In this case also, as explained with regard to the first embodiment, it is sufficient if the relationship A<D<C is satisfied in the present invention.

Third Embodiment

Figure 6:
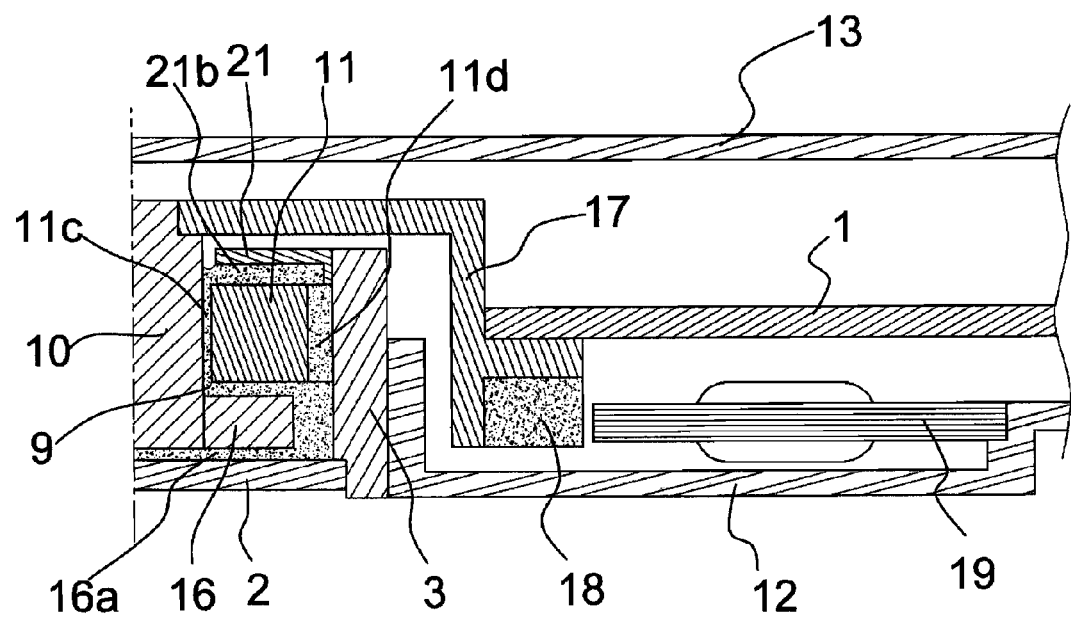
FIG. 6 is a partial cross-sectional view showing a motor for a disk drive device that uses a hydrodynamic bearing device of a third embodiment of the present invention.
Figure 7:
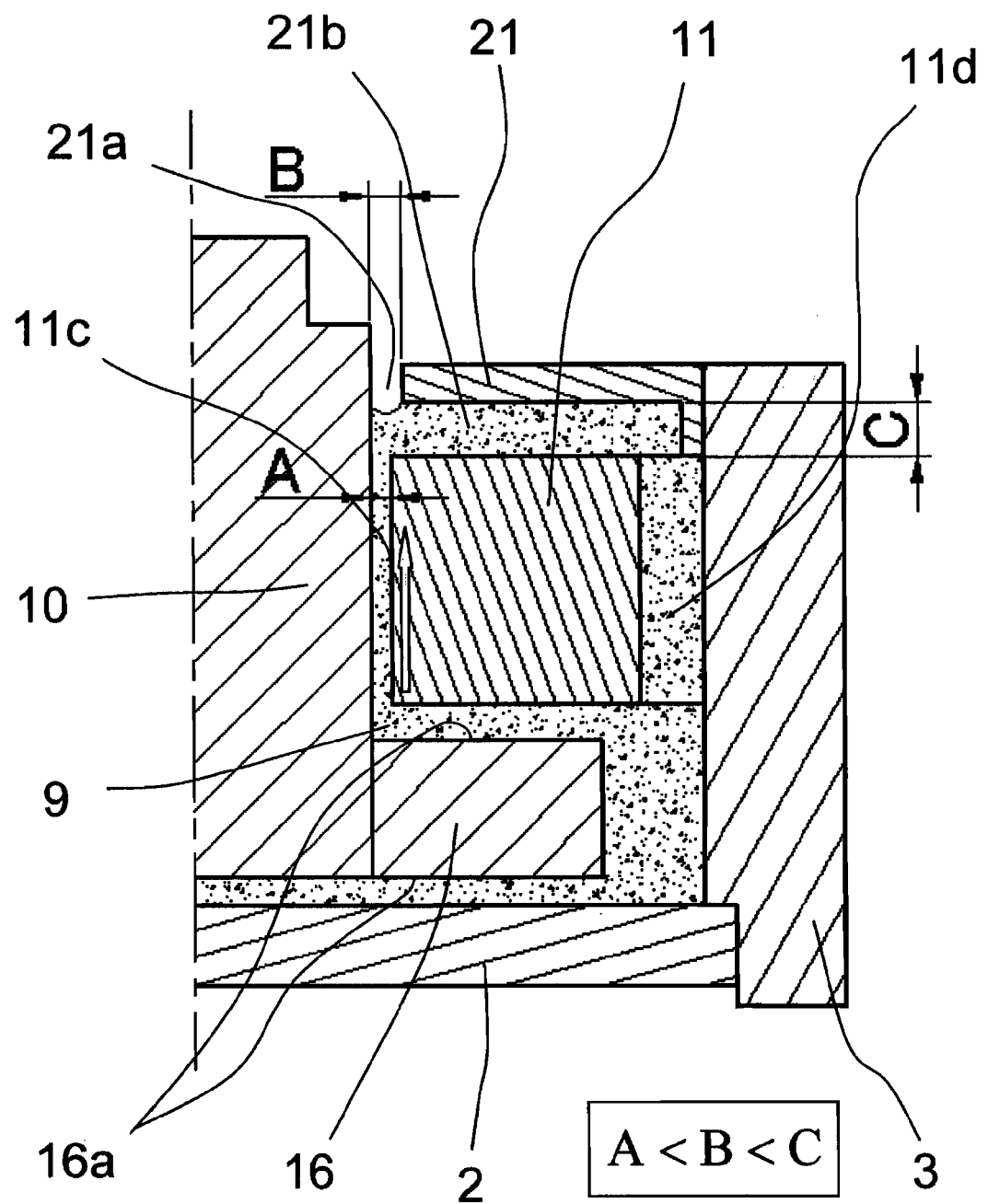
FIG. 7 is a cross-sectional view showing a configuration of an interior of the hydrodynamic bearing of a third embodiment of the present invention.

FIG. 6 is a partial cross-sectional view showing a configuration of a motor for a disk drive device and using a hydrodynamic bearing device of a third embodiment of the present invention having a rotating-shaft type with one side thereof closed. Furthermore, FIG. 7 is a view showing an internal configuration of the hydrodynamic bearing of the same embodiment.

In FIG. 6, a cylindrical sleeve 11 is secured to a base 12 via a cylindrical sleeve holder 3. A column shaped shaft 10, constituting a rotation axis, is inserted into this sleeve 11 so as to be rotatable freely. Furthermore, a disk shaped thrust flange 16 is secured to a lower edge of the shaft 10, and thrust hydrodynamic grooves 16a are formed on a top surface and a bottom surface thereof. In addition, an opening edge of a lower side of the sleeve 11 is sealed using a disk shaped thrust plate 2. A longitudinal groove is formed on an outer periphery of the sleeve 11, and defines a connecting hole 11d constituting a connecting channel between itself and the sleeve holder 3. Hereinafter, an explanation of sections identical to those of the above-explained embodiments is omitted.

As in the first embodiment, it is important to properly set the flow passage resistance in this embodiment in order to prevent oil leakage. As shown in FIG. 7, the corresponding condition is A<B<C in the present invention. It should be noted that this condition does not depend on a circulation direction of the oil 9. In this way, it is possible to prevent leakage of the oil.

Fourth Embodiment

Figure 8:
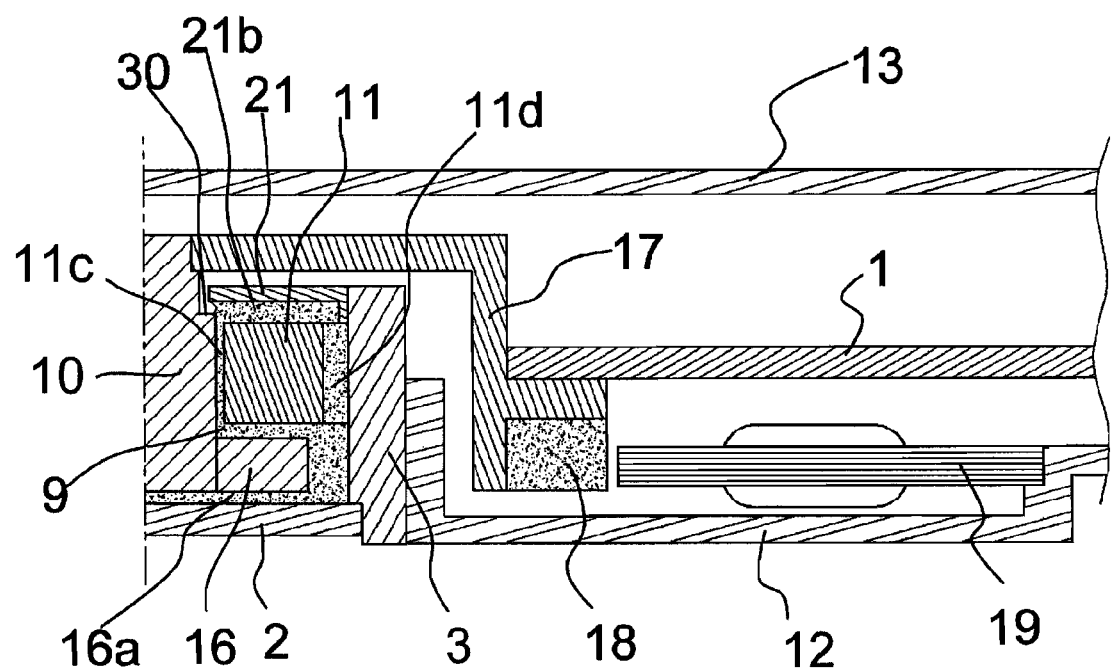
FIG. 8 is a cross-sectional view showing a motor for a disk drive device that uses a hydrodynamic bearing device of a third embodiment of the present invention.
Figure 9:
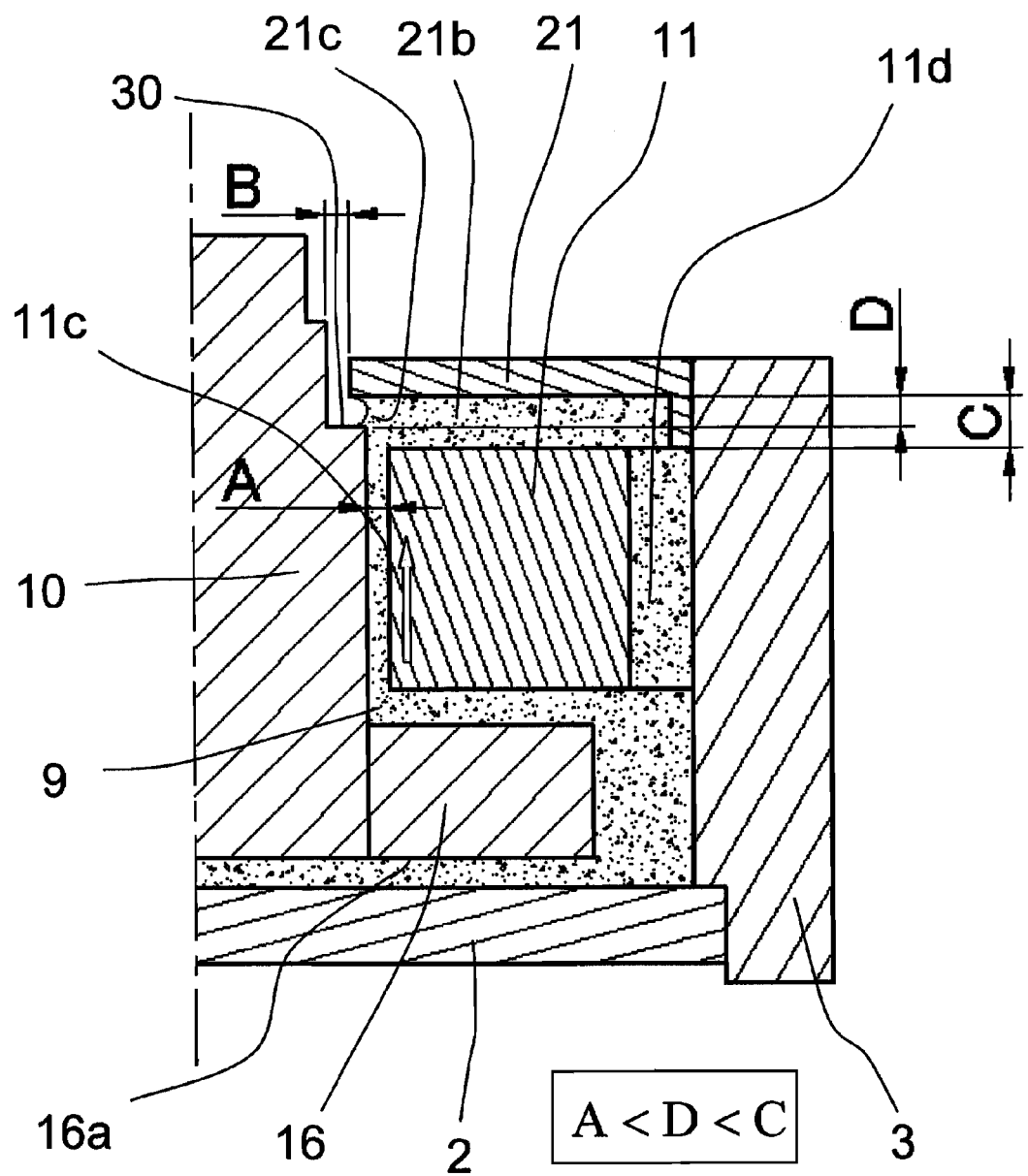
FIG. 9 is a cross-sectional view showing a configuration of an interior of the hydrodynamic bearing of a fourth embodiment of the present invention.

FIG. 8 is a partial cross-sectional view showing a configuration of a motor for a disk drive device and using a hydrodynamic bearing device having a rotating-shaft type with one side thereof closed of a fourth embodiment of the present invention. Furthermore, FIG. 9 is a view showing an internal configuration of the hydrodynamic bearing of the same embodiment.

In FIG. 8, a sleeve 11 is secured to a base 12 via a sleeve holder 3. A shaft 10, constituting a rotation axis, is inserted into this sleeve 11 so as to be rotatable freely. Furthermore, a thrust flange 16 is secured to a lower edge of the shaft 10, and thrust hydrodynamic grooves 16a are formed on a bottom surface thereof. In addition, an opening edge of a lower side of the sleeve 11 is sealed using a thrust plate 2. A longitudinal groove is formed on an outer periphery of the sleeve 11, and defines a connecting hole 11d constituting a connecting channel by itself and the sleeve holder 3. The shaft 10 is provided with a shaft step section 30, an opening section 21c is formed between an axis-direction end face of this shaft step section 30 and a lower surface of the seal plate 21, and an air-fluid boundary is formed therein. Other configuration is identical to that of the third embodiment. Hereinafter, an explanation of sections identical to those of the above-explained embodiments is omitted.

As in the second embodiment, it is important to properly set the flow passage resistance in this embodiment in order to prevent oil leakage. The corresponding condition is A<D<C in the present invention. It should be noted that, as shown in FIG. 9, this condition does not depend on a circulation direction of oil 9. In this way, it is possible to prevent leakage of oil from an opening section.

Fifth Embodiment

Figure 10:
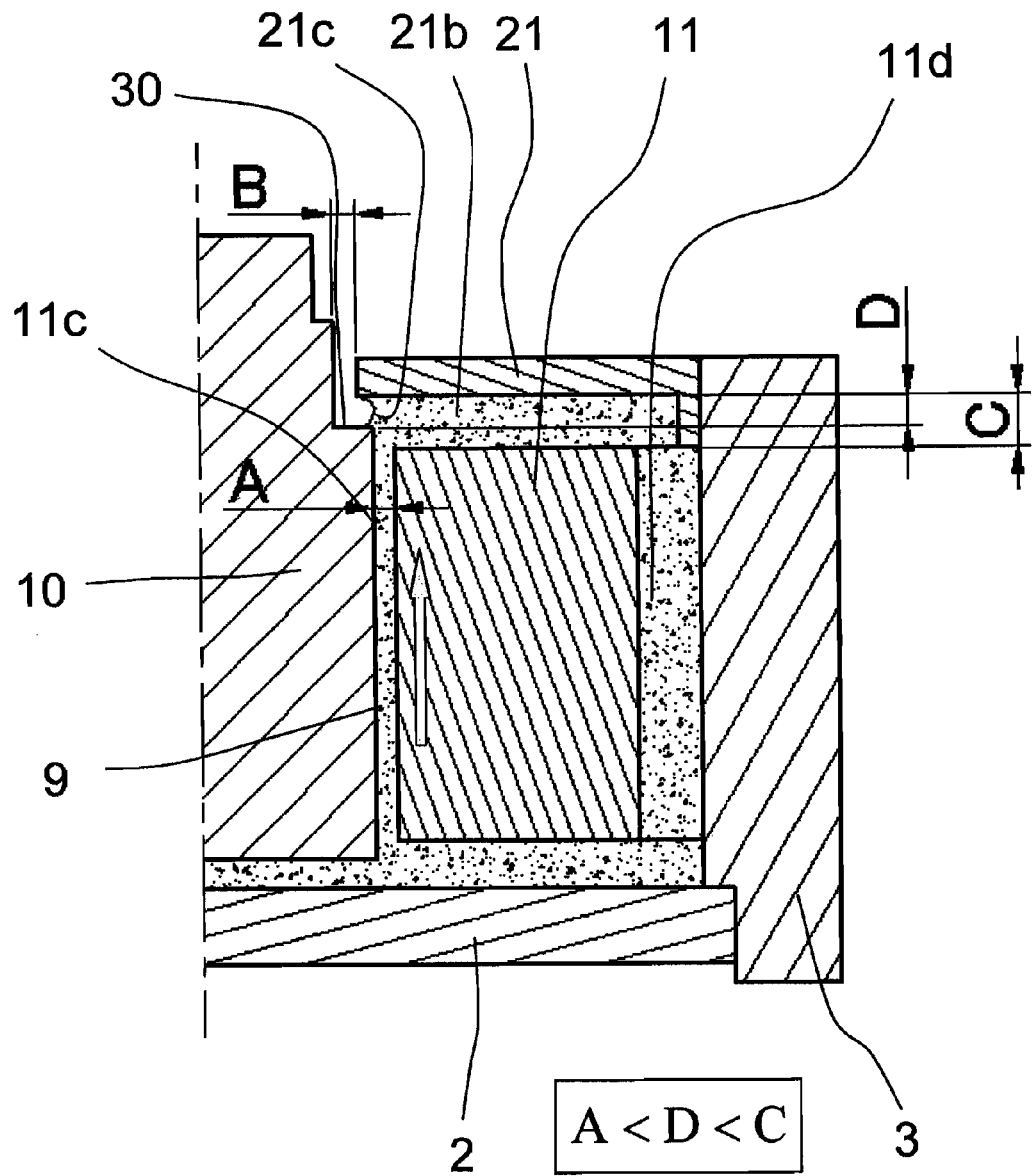
FIG. 10 is a cross-sectional view showing a configuration of an interior of the hydrodynamic bearing of a fifth embodiment of the present invention.

FIG. 10 is a view showing an internal configuration of a hydrodynamic bearing device having a rotating-shaft type with one side thereof closed of a fifth embodiment of the present invention. This embodiment differs from the above-explained fourth embodiment in that a thrust flange is not provided at a bottom end of the shaft 10. In place thereof, thrust hydrodynamic grooves are formed on either a bottom end face of the shaft 10 or a thrust plate 2, realizing a thrust bearing. Furthermore, since an inner periphery lower end face of a seal plate 21, constituting a sealing member, and an axis-direction end face of a shaft step section 30 provided on the shaft 10 are opposed at a distance so as to form an axis-direction clearance D, extraction or dropping of the shaft 10 from a fixed section side is prevented. Hereinafter, an explanation of sections identical to those of the above-explained embodiments is omitted.

As in the second embodiment, it is important to properly set the flow resistance in this embodiment in order to prevent oil leakage. As shown in FIG. 10, the corresponding condition is A<D<C in the present invention. It should be noted that this condition does not depend on a circulation direction of the oil 9. In this way, it is possible to prevent leakage of oil from an opening section.

It should be noted, that, although the seal plate 21 constituting a sealing member was explained in an above embodiment as being configured to be secured to an inner periphery of a hub 17 or a sleeve holder 3, the present invention is not limited to this configuration, and the seal plate 21 may be directly secured to the sleeve 11. Furthermore, although an example of a sleeve 11 secured to the base 12 via the sleeve holder 3 was given in the third, fourth, and fifth embodiments, it goes without saying that the present invention is not limited to this.

It should be noted that although the above embodiments were explained in terms of a single-thrust configuration having a shaft with both fixed ends and a hydrodynamic bearing having a rotating-shaft type with one side thereof closed, the present invention is not limited to these configurations and can be adapted to a hydrodynamic bearing of a configuration having a lubricating fluid reservoir section in close proximity to a radial bearing and including an opening section opening to the atmosphere.

Furthermore, although the interface between the oil 9 and the atmosphere corresponds to the fifth gap in the second, fourth, and fifth embodiments, in the same way as in the first embodiment, it is possible to define the interface with the atmosphere in the gap B, constituting the second gap. In such a case, it goes without saying that settings should be made such that A<B<C.

Figure 13:
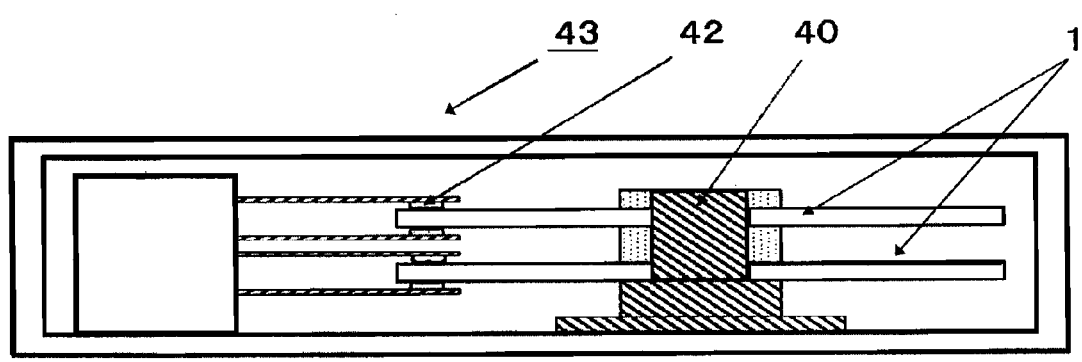
FIG. 13 is a cross-sectional view of a recording and reproducing apparatus.

Furthermore, by applying a spindle motor 40 having the above-described hydrodynamic bearing in a recording and reproducing apparatus 43, such as a magnetic disk device as shown in FIG. 13, it is possible to provide a highly-reliable recording and reproducing apparatus free of the occurrence of contamination of an interior as a result of oil leakage and read-write errors caused thereby. In this apparatus, a recording and playback head 42 is disposed in close proximity to a plurality of recording disks 1, and special care must be taken with respect to internal contamination that can cause head crashes.

From the above, the hydrodynamic bearing device according to the present invention is configured as a hydrodynamic bearing using a lubricating fluid and comprises a shaft 10, a sleeve 11 rotatable relative to the shaft 10, having an inner peripheral surface opposing an outer peripheral surface of the shaft 10 at a distance in a radial direction so as to form a first gap (11a) (radial clearance A), and a sealing member provided as one with the sleeve 11 such that a second gap (21a, 21c) (radial clearance B, axis-direction clearance D) is formed between the sealing member and the shaft 10 and having an end face opposing one side surface of the sleeve 11 at a distance in an axis direction so as to form a third gap (21b) (axis-direction clearance C). An interface between oil 9 and the atmosphere is formed in the second gap (21a, 21b). The relationship First clearance size<Second clearance size<Third clearance size is satisfied. Since the size relationships of the bearing gap sections are optimally set as explained above, it is possible to configure a high-precision, long-lifespan hydrodynamic bearing device wherein oil is retained and circulated in an interior thereof without leakage to an exterior and no running out of oil occurs in bearing gaps.

Examples of Other Embodiments

The above-explained embodiments of the present invention are not limited, and without departure from the range of the present invention, many shape variations and corrections are possible.

For example, the hydrodynamic grooves of each dynamic pressure bearing can be formed on either opposing side forming a minute gap.

The hydrodynamic bearing device according to the present invention supports more compact, more lightweight, and thinner designs, and in addition, by providing a highly-reliable bearing with no leakage of the operating fluid, can significantly improve the reliability of devices in which it is used.

This application claims priority to Japanese Patent Application No. 2006-308792. The entire disclosure of Japanese Patent Application No. 2006-308792 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A hydrodynamic bearing device, comprising:
a shaft;
a sleeve configured to rotate relative to the shaft, the sleeve having an inner peripheral surface opposing an outer peripheral surface of the shaft at a distance in a radial direction so as to form a first gap therebetween;
a sealing member provided as one with the sleeve, having an inner peripheral surface opposing an outer peripheral surface of the shaft at a distance in a radial direction so as to form a second gap therebetween, and having an end face opposing one side end face of the sleeve at a distance in an axis direction so as to form a third gap therebetween;
a thrust flange provided in close proximity to an end of the shaft, having a diameter larger than that of the shaft, and having an end face opposing the other side end face of the sleeve at a distance in an axis direction so as to form a fourth gap therebetween;
at least one connecting channel between the third gap and the fourth gap to connect the third gap and the fourth gap therebetween; and
a lubricating fluid retained in at least the first gap, the third gap, the fourth gap, and the connecting channel;
a radial dynamic pressure bearing is formed in the first gap,
an interface between the lubricating fluid and the atmosphere is formed in the second gap, and
a radial clearance A of the first gap, a radial clearance B of the second gap, and an axis direction clearance C of the third gap satisfy a relationship $A<B<C$.

2. The hydrodynamic bearing device of claim 1, wherein dynamic pressure generated by the radial dynamic pressure bearing is generated in a direction such that the lubricating fluid flows from the first gap towards the second gap or the third gap.

3. The hydrodynamic bearing device of claim 1, wherein a thrust dynamic pressure bearing is formed in the fourth gap.

4. The hydrodynamic bearing device of claim 3, wherein dynamic pressure generated by the radial dynamic pressure bearing or the thrust dynamic pressure bearing is generated in a direction such that the lubricating fluid flows from the first gap towards the second gap or the third gap.

5. A hydrodynamic bearing device, comprising:
a shaft;
a sleeve configured to rotate relative to the shaft, the sleeve having an inner peripheral surface opposing an outer peripheral surface of the shaft at a distance in a radial direction so as to form a first gap therebetween;
a sealing member provided as one with the sleeve, having an inner peripheral surface opposing an outer peripheral surface of the shaft at a distance in a radial direction so as to form a second gap therebetween, and having an end face opposing one side end face of the sleeve at a distance in an axis direction so as to form a third gap therebetween;
a thrust plate opposing the other side end face of the sleeve at a distance in an axis direction so as to form a fourth gap therebetween and sealing one opening end of the sleeve;
at least one connecting channel between the third gap and the fourth gap to connect the third gap and the fourth gap; and
a lubricating fluid retained in at least the first gap, the third gap, the fourth gap, and the connecting channel;
a radial dynamic pressure bearing is formed in the first gap,
an interface between the lubricating fluid and the atmosphere is formed in the second gap, and
a radial clearance A of the first gap, a radial clearance B of the second gap, and a third axis-direction clearance C satisfy a relationship $A<B<C$.

6. The hydrodynamic bearing device of claim 5, wherein dynamic pressure generated by a radial hydrodynamic groove is generated in a direction such that the lubricating fluid is flown from the first gap towards the second gap or the third gap.

7. A hydrodynamic bearing device, comprising:
a shaft having a cylindrical section and a small diameter cylindrical section, the small diameter cylindrical section being provided via a step surface in close proximity to one end section of the cylindrical section and having a diameter smaller than the outer diameter of the cylindrical section;
a sleeve configured to rotate relative to the shaft, the sleeve having an inner peripheral surface opposing an outer peripheral surface of the cylindrical section of the shaft at a distance in a radial direction so as to form a first gap therebetween;
a sealing member provided as one with the sleeve, having an inner peripheral surface opposing an outer peripheral surface of the small diameter cylindrical section of the shaft at a distance in a radial direction so as to form a second gap therebetween, and having an end face opposing both the step surface of the shaft at a distance in an axis direction so as to form a fifth gap therebetween and one side end face of the sleeve at a distance in an axis direction so as to form a third gap therebetween;

a thrust flange provided in close proximity to the other end side of the shaft, having an end face opposing the other side end face of the sleeve at a distance in an axis direction so as to form a fourth gap therebetween, and having a diameter larger than that of the cylindrical section of the shaft;

at least one connecting channel between the third gap and the fourth gap to connect the third gap and the fourth gap; and a lubricating fluid retained in at least the first gap, the third gap, the fourth gap, and the connecting channel;

a radial dynamic pressure bearing is formed in the first gap, an interface between the lubricating fluid and the atmosphere is formed in the fifth gap, and a radial clearance A of the first gap, an axis direction clearance D of the fifth gap, and an axis-direction clearance C of the third gap satisfy a relationship $A<D<C.$ 8. The hydrodynamic bearing device of claim 7, wherein dynamic pressure generated by a radial hydrodynamic groove is generated in a direction such that the lubricating fluid is flown from the first gap towards the fifth gap or the third gap.

9. The hydrodynamic bearing device of claim 7, wherein a thrust dynamic pressure bearing is formed in the fourth gap.

10. The hydrodynamic bearing device of claim 9, wherein dynamic pressure generated by the radial dynamic pressure bearing or the thrust dynamic pressure bearing is generated in a direction such that the lubricating fluid is flown from the first gap towards the fifth gap or the third gap.

11. A hydrodynamic bearing device, comprising:
a shaft having a cylindrical section and a small diameter cylindrical section, the small diameter cylindrical section being provided via a step surface in close proximity to one end section of the cylindrical section and having a diameter smaller than the outer diameter of the cylindrical section;

a sleeve configured to rotate relative to the shaft, the sleeve having an inner peripheral surface opposing an outer peripheral surface of the cylindrical section of the shaft at a distance in a radial direction so as to form a first gap therebetween;

a sealing member provided as one with the sleeve, having an inner peripheral surface opposing an outer peripheral surface of the small diameter cylindrical section of the shaft at a distance in a radial direction so as to form a second gap therebetween, and having an end face opposing both the step surface of the shaft at a distance in an axis direction so as to form a fifth gap therebetween and one side end face of the sleeve at a distance in an axis direction so as to form a third gap therebetween;

a thrust plate opposing the other side end face of the sleeve at a distance in an axis direction so as to form a fourth gap therebetween and sealing one opening end of the sleeve;

at least one connecting channel between the third gap and the fourth gap to connect the third gap and the fourth gap; and a lubricating fluid retained in at least the first gap, the third gap, the fourth gap, and the connecting channel;

a radial dynamic pressure bearing is formed in the first gap, an interface between the lubricating fluid and the atmosphere is formed in the fifth gap, and a radial clearance A of the first gap, an axis direction clearance D of the fifth gap, and an axis direction clearance C of the third gap satisfy a relationship $A<D<C.$ 12. The hydrodynamic bearing device of claim 11, wherein dynamic pressure generated by the radial dynamic pressure bearing is generated in a direction such that the lubricating fluid flows from the first gap towards the fifth gap or the third gap.

13. A hydrodynamic bearing device having a hydrodynamic bearing using a lubricating fluid, comprising:
a shaft;
a sleeve configured to rotate relative to the shaft, the sleeve having an inner peripheral surface opposing an outer peripheral surface of the shaft at a distance in a radial direction so as to form a first gap therebetween; and a sealing member provided as one with the sleeve such that a second gap is formed between the sealing member and the shaft and having an end face opposing one side end face of the sleeve at a distance in an axis direction so as to form a third gap therebetween;

an interface between the lubricating fluid and the atmosphere is formed in the second gap, and a relationship is such that the first gap size<the second gap size<the third gap size.

14. The hydrodynamic bearing device of claim 13, wherein the second gap is a radial clearance formed between an outer peripheral surface of the shaft and an inner peripheral surface of the sealing member.

15. The hydrodynamic bearing device of claim 13, wherein:
the shaft is formed with an end face facing in the axis direction; and
the second gap is an axis direction clearance formed between an end face of the shaft and an end face of the sealing member.

16. The hydrodynamic bearing device of claim 13, wherein:
a radial dynamic pressure bearing is formed in the first gap; and
dynamic pressure generated by the radial dynamic pressure bearing is generated in a direction such that the lubricating fluid flows from the first gap towards the second gap or the third gap.

17. A spindle motor comprising the hydrodynamic bearing device of claim 13.

18. A recording and reproducing apparatus comprising the spindle motor of claim 17.

* * * * *